March 3, 1970     P. BOTTERO     3,498,513
AUTOMATIC TABLE PERFORMING ALL CUTTING OPERATIONS BY
RATIONAL SEQUENCES IN GLASSWORKS PRODUCING
A CONTINUOUS GLASS BAND Filed Feb. 16, 1965     14 Sheets-Sheet 1

INVENTOR.
PASQUALE BOTTERO
BY
Michael S. Striker
Attorney

March 3, 1970   P. BOTTERO   3,498,513
AUTOMATIC TABLE PERFORMING ALL CUTTING OPERATIONS BY
RATIONAL SEQUENCES IN GLASSWORKS PRODUCING
A CONTINUOUS GLASS BAND
Filed Feb. 16, 1965   14 Sheets-Sheet 2

Fig. 4

INVENTOR.
PASQUALE BOTTERO
BY
Michael S. Striker
Attorney

Fig. 8

United States Patent Office 3,498,513
Patented Mar. 3, 1970

3,498,513
AUTOMATIC TABLE PERFORMING ALL CUTTING OPERATIONS BY RATIONAL SEQUENCES IN GLASSWORKS PRODUCING A CONTINUOUS GLASS BAND
Pasquale Bottero, Cuneo, Italy, assignor to Corporation S.a.s. Bottero & C., Cuneo, Italy
Filed Feb. 16, 1965, Ser. No. 433,062
Claims priority, application Italy, July 7, 1964, 15,331/64
Int. Cl. B26f 3/00; B65h 35/00
U.S. Cl. 225—96.5
18 Claims

ABSTRACT OF THE DISCLOSURE

A glass scoring and breaking apparatus in which a sheet of glass supported in a horizontal plane is first scored along a plurality of parallel score lines spaced in transverse direction selected distances from each other and then the sheet is stepwise moved in the direction transverse to the score lines in such a manner that the score lines are one by one aligned with pressing means pressing the glass sheet against stationary abutment means to stress the glass sheet at the aligned score line while the glass sheet portion projecting beyond the score line aligned with the pressing means remains unsupported to cause a break of the glass sheet along the aligned score line.

---

Object of the present invention is to realize a table which automatically i.e. at proper consecutive intervals performs all operations presently performed partly mechanically and partly by hand in the cutting process of glassworks producing either vertical or horizontal continuous glass bands. To allow to understand generally the automation of the present invention, it is suitable to describe first the operations taking place in such a cutting operation. Fundamentally these operations may be described according to their sequence as follows: cutting off a glass sheet from the continuous glass band and arrangement on a table which moves from a vertical position automatically to a horizontal position, placing the glass sheet in a correct squaring position. Sheet engraving by sharp knives arranged on a proper sliding carriage movable lengthwise on the table. Transfer of the engraved sheet, breaking of edge, usually ragged, in order to get a perfect straight edge line. Cutting of the glass sheet in single members according to engraving previously made and transfer of them into packing boxes.

Since these are the essential operations, the table of the present invention provides an assembly of means and devices whose working function is characterized by limit stop members at the unit performing the previous operation, in order to carry out processing by rational sequences duly arranged without interference with manual operations, realizing in this way the whole automation of the table under the present invention.

The object of the present invention is schematically illustrated, as an example realized in practice, by the following drawings:

FIG. 11a shows a section on a line A–B of FIG. 11.

Now assuming that the table being fundamentally formed by a classical table V or first support means (used in glassworks), which table can be tilted vertically and by a complementary table or second support means connected to it by special kinematic chains guided over pulley on linkage 64, the table itself operates as follows:

The glass sheet cut off from the continuous glass band is set on the table V when the latter is in vertical position and there held by a proper device and when coming back to the horizontal position the correct squaring of the glass sheet occurs by a complementary device.

At this moment the carriage Z of the cutting knives which has been previously set on a suitable controller is moved in a known manner over the glass sheet to cut or score the latter along score lines spaced a predetermined distance from each other;

After scoring, the table provided with a lifting belt system lifts the glass sheet from its level in order to transfer the scored glass sheet towards the complementary table (15–15'–48–54) according to the sizes already prefixed. At this moment the glass sheet must be displaced as much as required to break off the edge and after that it is moved step by step according to the distance between the scores lines produced by the cutting device from the classical table V, i.e. the table turning over vertically, onto the complementary table 15–15'–48–54 of the present invention. Between these two tables it is arranged, as already said, the breaking off device which mainly comprises a supporting cylinder arranged to rise vertically on the respective score line of the glass sheet, and of means to move the complementary table to bend the glass sheet and thereby cause the breakage of the same at the respective score line, after which the glass sheet carries on its travel on the complementary table as far as to contact a limit stop causing the vertical turnover of a portion of this table to allow operators to take off the cut glass sheet.

Figure 1:
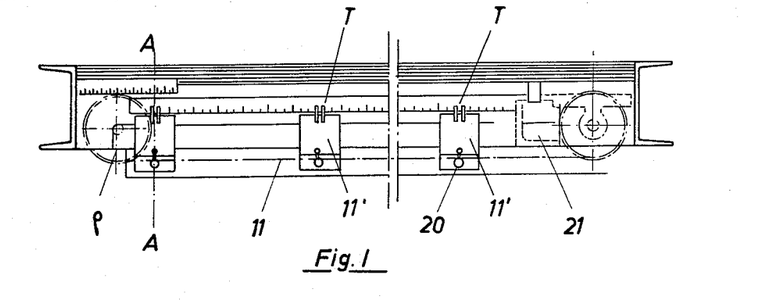
FIG. 1 shows side view of a controller device for cutting glass sheets.
Figure 2:
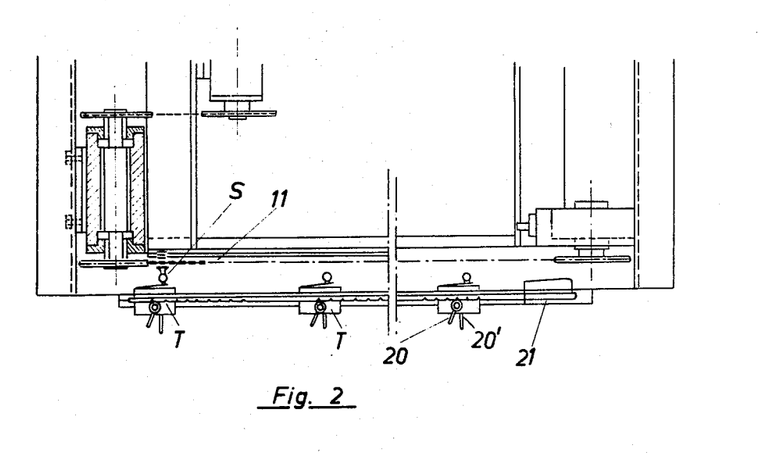
FIG. 2 shows the plan view of FIG. 1.
Figure 3:
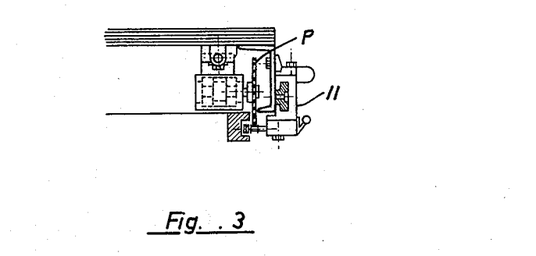
FIG. 3 shows a section on a line A—A of FIG. 1.
Figure 4:
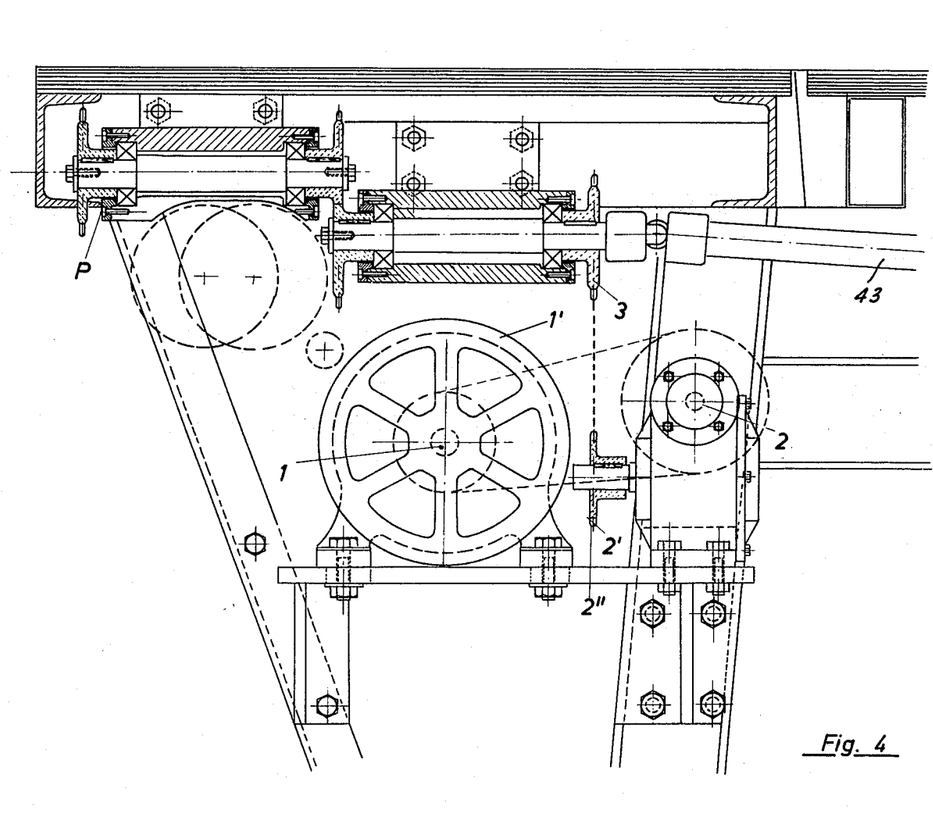
FIG. 4 shows a side view of the drive unit for the controller device.
Figures 5, 6:
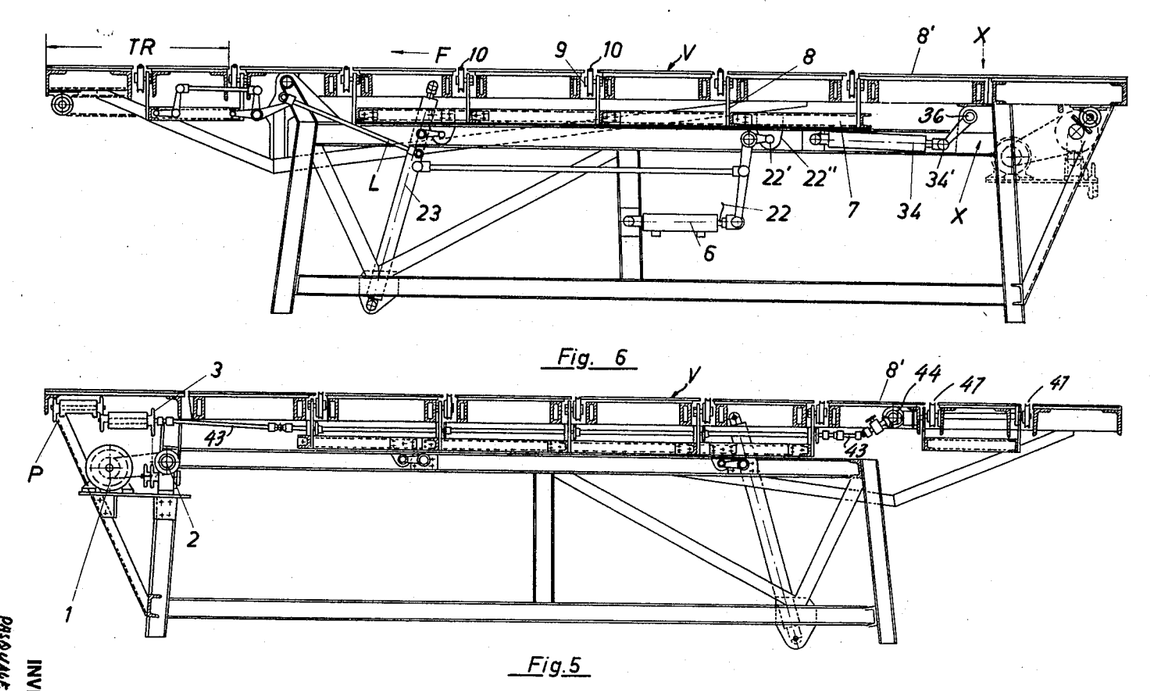
FIG. 5 shows a side view of the translation device for moving the glass sheets towards the cutting device.
FIG. 6 shows the lift device for belts before translation of glass sheets towards the cutting device.
Figure 7:
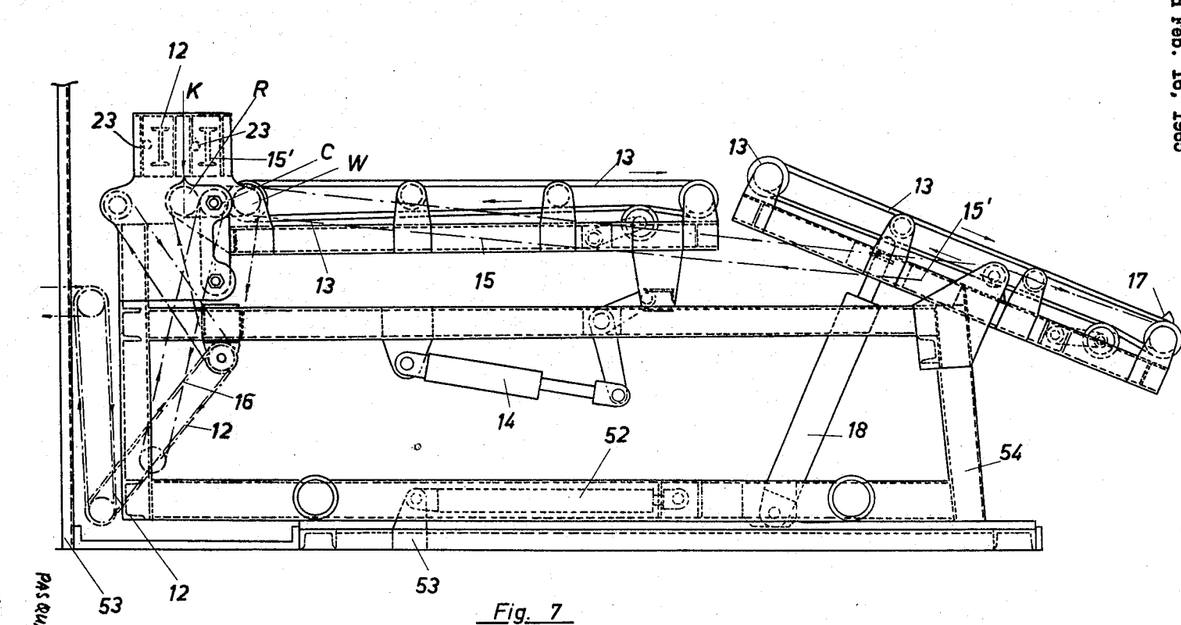
FIG. 7 shows the cutting device and particularly the breaking section.
Figure 8:
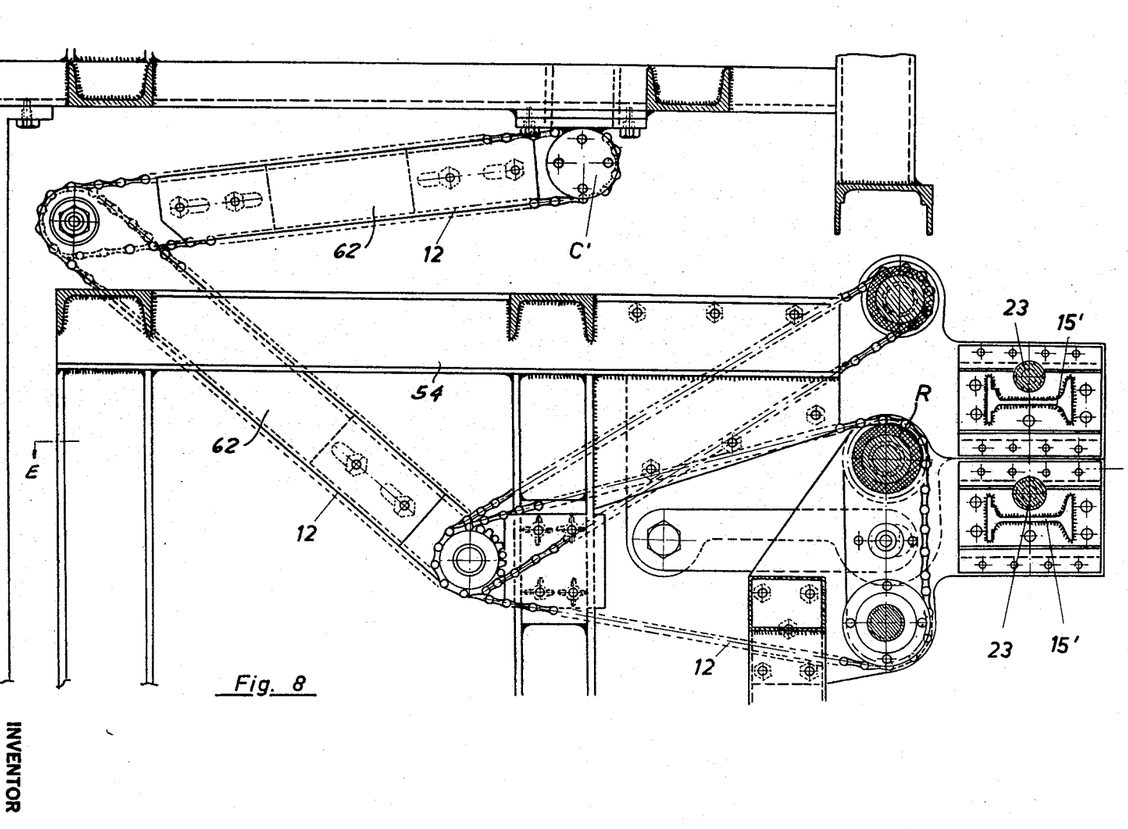
FIG. 8 shows a detail of the cutting device and the glass sheet feed motion device.
Figure 9:
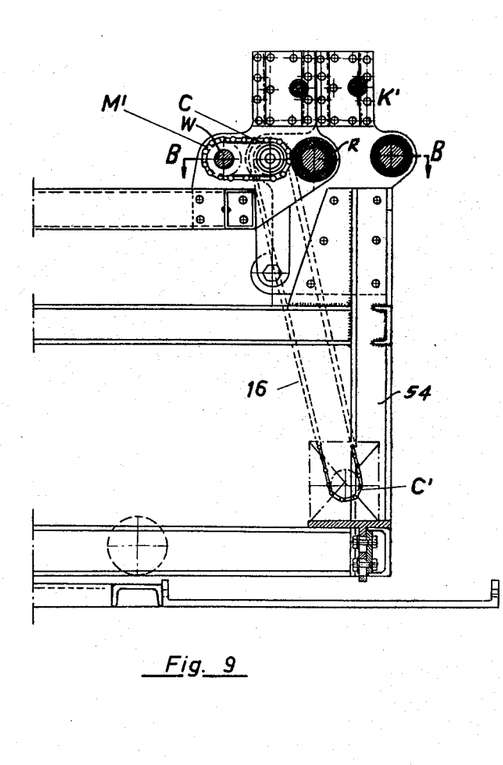
FIG. 9 shows a glass sheet feed motion device for use after cutting of the glass sheet.
Figure 10:
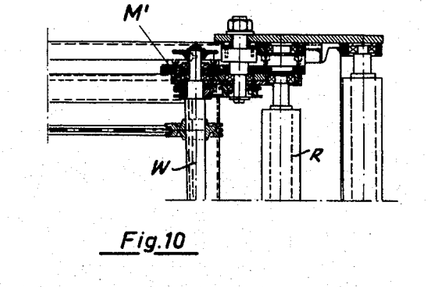
FIG. 10 shows the section on a line B—B of FIG. 9.
Figure 11:
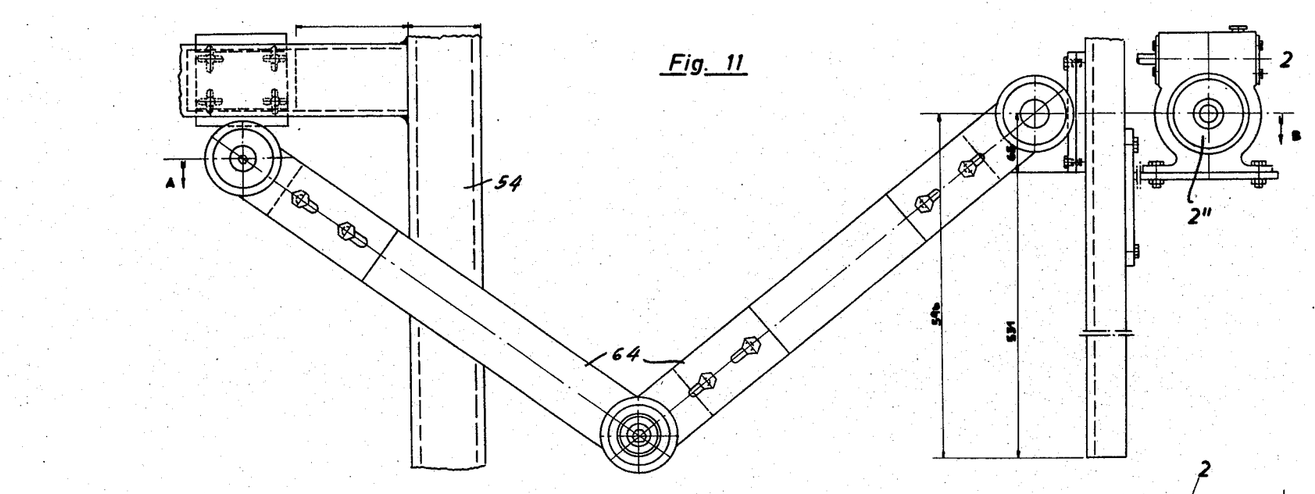
FIG. 11 shows connection member at the table receiving glass sheets from the continuous glass band to the cutting table.

Due to the complexity of the cooperating devices it will be necessary, for a better understanding of the invention, to describe the operation of the devices in question. First of all the machine is programmed by arranging switches T (FIG. 1) at a distance from each other according to the distance between the desired score and break off lines. Such switches T are operated by contact S on the chain 11 moved through gears P and in turn by the motor 1 (FIG. 4). The motor 1 operates through the reduction gear 2 on which it is keyed the sprocket wheel 21 connected by a chain to sprocket 3 and the gear P to rotate chain 11 and the sprocket wheel 2″ to operate chain H′ driving the sprocket wheel H (FIG. 11a) by a free wheel system N in such a manner that when chain 11 rotates in clockwise direction sprocket wheels 2′ and 2″ rotate to operate transversal belts of both tables while during counterclockwise rotation only sprocket wheel 2′ rotates (by the free wheel N) to operate translation belts arranged on the classical table V and in parallel to operate chain 11 during its return travel. After performance of the operations above mentioned, the actual break off operation is performed. Assuming the classical table V already arranged at the horizontal position and its travel completed, the hydraulic cylinder 6 (FIG. 6) is set into operation, which is controlled by an electrovalve 22″ lifts the frame 7 on which supports 8 holding the pulleys 9 of the transversal translation belts 10 are arranged. When cylinder 6 has ended its travel, it contacts a limit stop 22 (FIG. 6) exciting the motor 1 which through reduction gear 2 (FIG. 4) and transmission 3 causes rotation of pulleys 9 and belts 10, so starting translation of the glass sheet towards the breaking off device. Simultaneously with rotation of the belts 10 also chain 11 (FIG. 1) rotates and contacts, by contact S (FIG. 2) the first switch T arranged at a distance equal to the distance of the first score line from the edge of the glass sheet and so forth as other switches are set corresponding to the distances of the prefixed widths the glass sheets are to be cut. Every time that S contacts a switch T (FIG. 2), the glass sheet translation stops at the right moment when the score line performed by the knives of carriage Z is exactly on section K of the roller R (FIG. 7). At the moment the switch 20 (FIG. 6), which stops the advance of the glass sheet, controls the cylinder 14 (FIG. 7) causing the lowering of the break off table 15 in order to give the table an angle assisting the breaking off operation. At the same time in order to avoid breaking off other glass strips, roller R, which is independent of roller W, rises by means of a free wheel device M′ (FIG. 10), as much as required to contact the glass sheet on the cutting line K where, being retained by small blocks, member 15′, it will be stressed most to cause a neat break while avoiding breakage at the bordering sections (FIG. 7). With regard to the breaking off of the edge (which obviously is performed before breaking off of the strips of glass) the abutment 15′ (FIG. 8) arranged over the cut line have also the purpose to constrict the edge to be bent at the angle required by counter-action of lowering the table 15. The abutments 15′ are also employed to break off small glass strips the weight thereof is not sufficient to assure their breaking. Thus broken off, the strip is moved forward on the cutting table 15 due to the rotation of the driving gear C (FIGS. 7–9) operated by the chain system 16 (FIGS. 7–8–9–10) which through a suitable transmission takes the motion of the motor-reduction gear C′ (FIG. 9) until it reaches the end of the table, where the glass strip then contacts the limit stop 17 (FIG. 7) arranged at the end of the turning over portion 15′ and causes stopping of the belts 13 and operation of cylinder 18 which in turn causes the nearly vertical tilting of 15′ from which the cut member is taken off. At this moment the limit stop 17 is released by cylinder 18 is retracted and returns to its normal position simultaneously with the cylinder 14 (FIG. 7) to start feeding of the following glass strip and so on repeating the same cycle as many times as required by the number of the strips to be cut for each glass sheet. Now the contact S (FIG. 2) reaching the last stop for the edge cutting excites the limit stop 20 (FIG. 1) causing the reversed rotation of the chain 11 which brings back the contact S to its starting position as far as such a contact contacts the limit stop 21, stopping rotation of chain 11, and excites the cylinder 6 for lowering belts 10 which when ends its travel contacts the switch T (FIG. 6) operating the cylinder 23 and causing the table for receiving the next glass sheet from the continuous glass band and then to continue the following cycle. Thus stated its essential structure and its fundamental functions, the invention shows further improvements and complementary means to assist the operation above specified.

Figure 12:
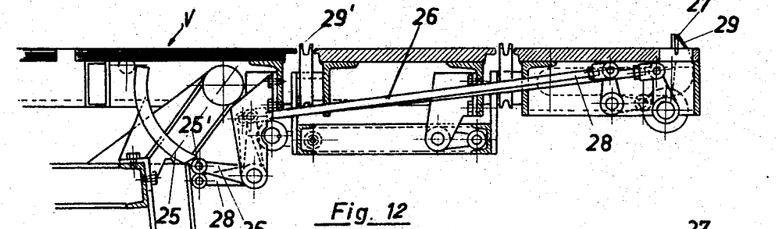
FIG. 12 shows a section on a line C—C of FIG. 16 of the device for stop-retaining and squaring glass sheet on the table of FIG. 25.
Figure 13:
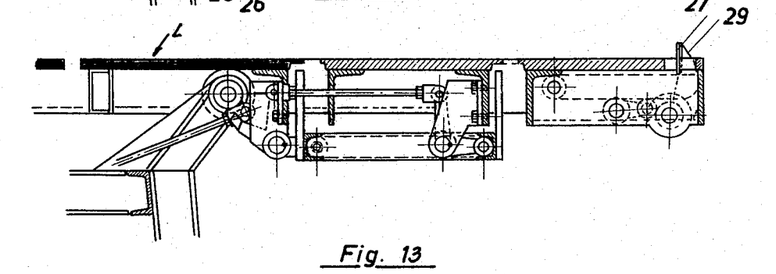
FIG. 13 shows a section on a line D—D of FIG. 16 of the lift device at the turning over portion of the classical table TR (see FIG. 6).
Figure 14:
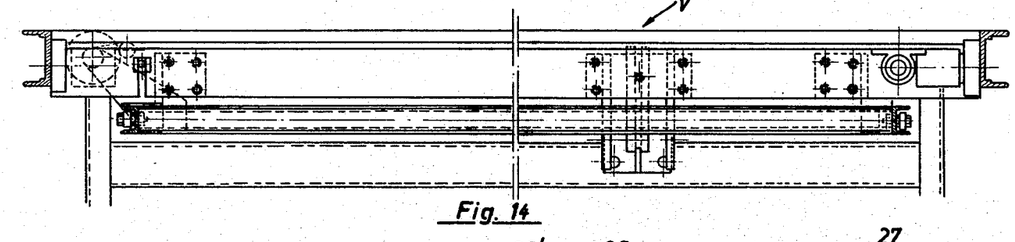
FIG. 14 shows the belt frame at the turning over portion of the classical table V.
Figure 15:
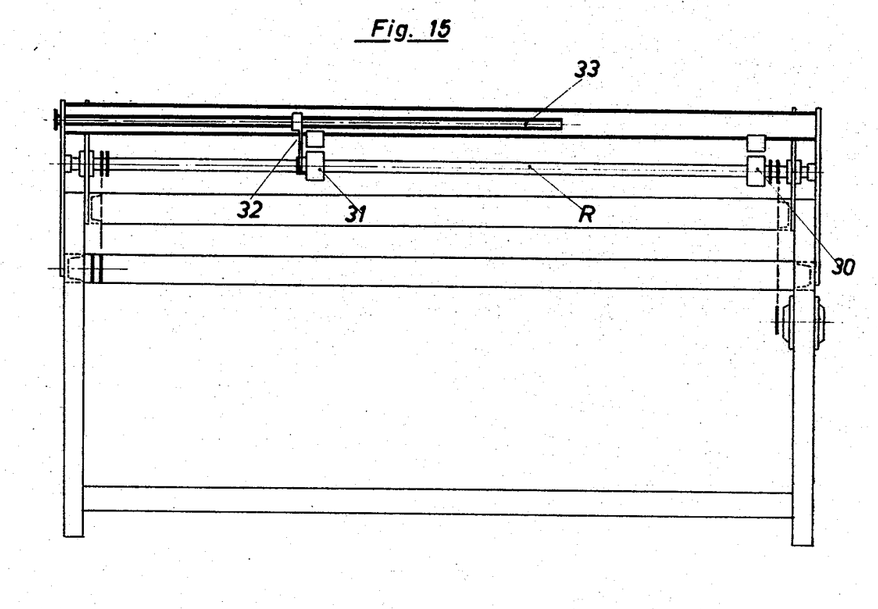
FIG. 15 shows a section on a line E—E of FIG. 8.
Figure 16:
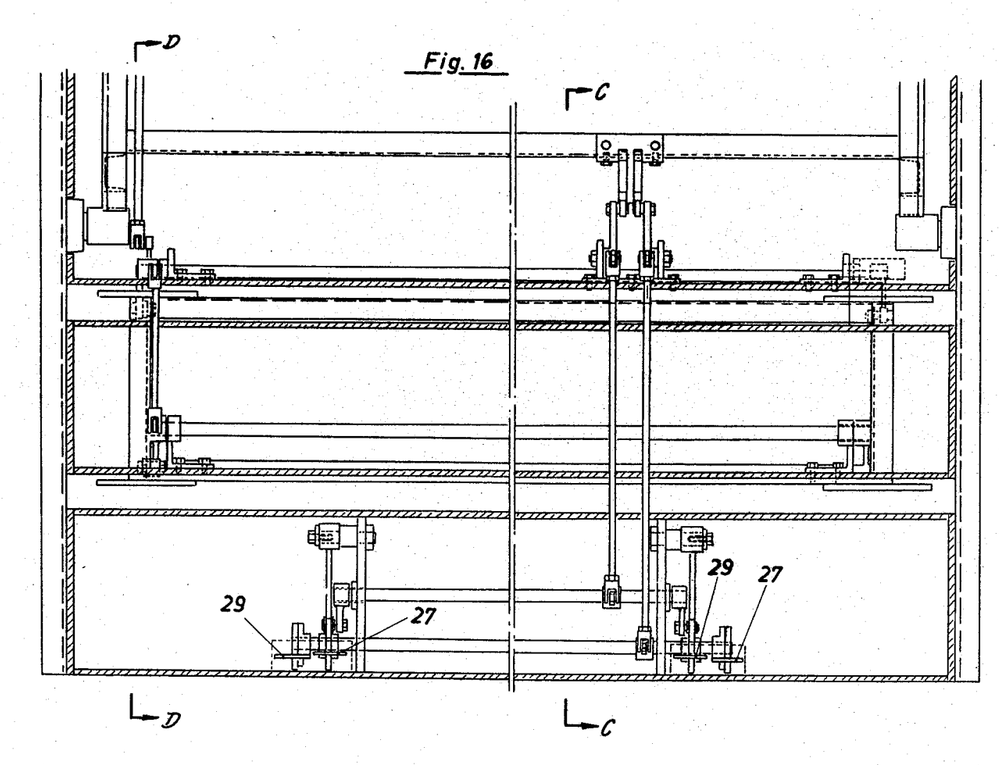
FIG. 16 shows plan view of FIGS. 14 and 15, i.e., a device for squaring glass sheets on the table and lifting frame for belts.
Figure 17:
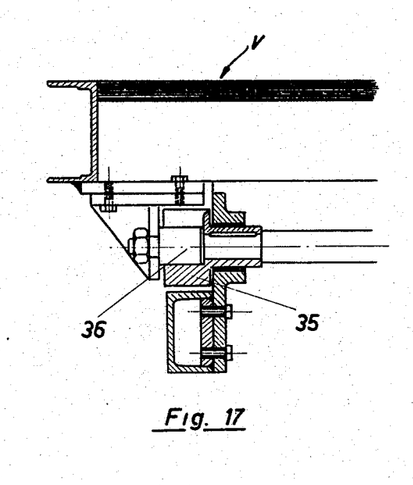
FIGS. 17–19 show the details of the alignment and clamp device between the stationary portion V and the turning over portion TR of the table respectively.
Figure 18:
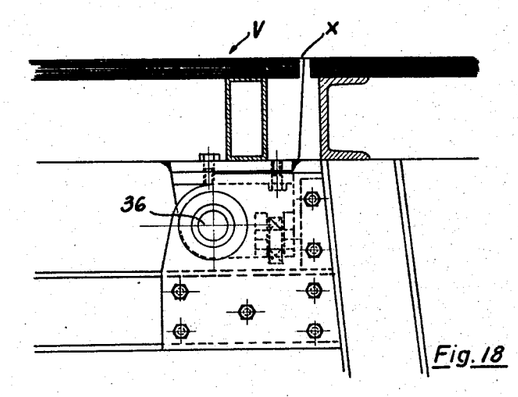
Figure 19:
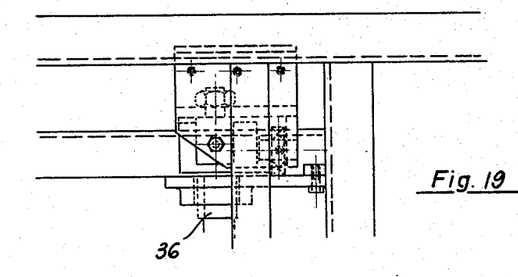
Figure 20:
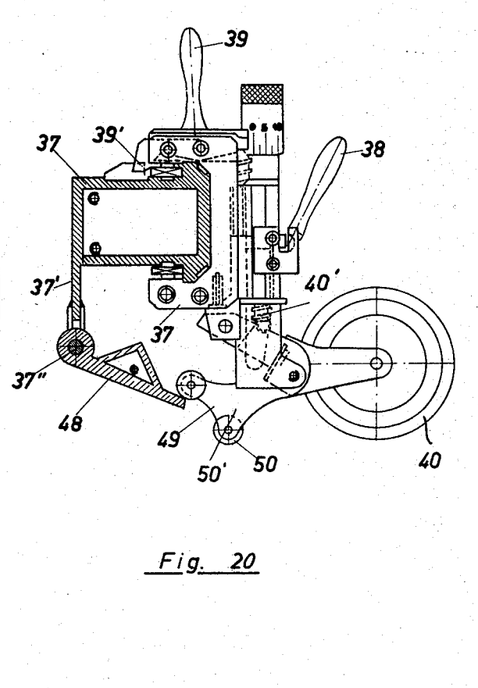
FIGS. 20–22 show views and sections of the sharp knives for engraving the glass sheet and their arrangement on the travel bridge.
Figure 21:
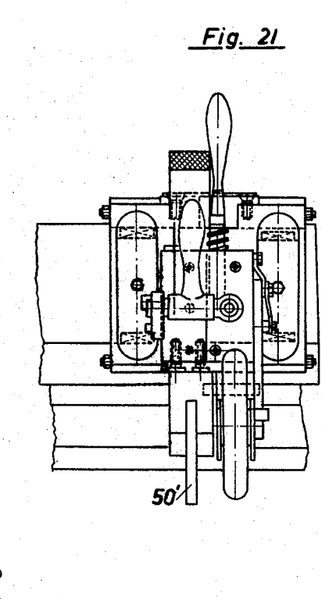
Figure 23:
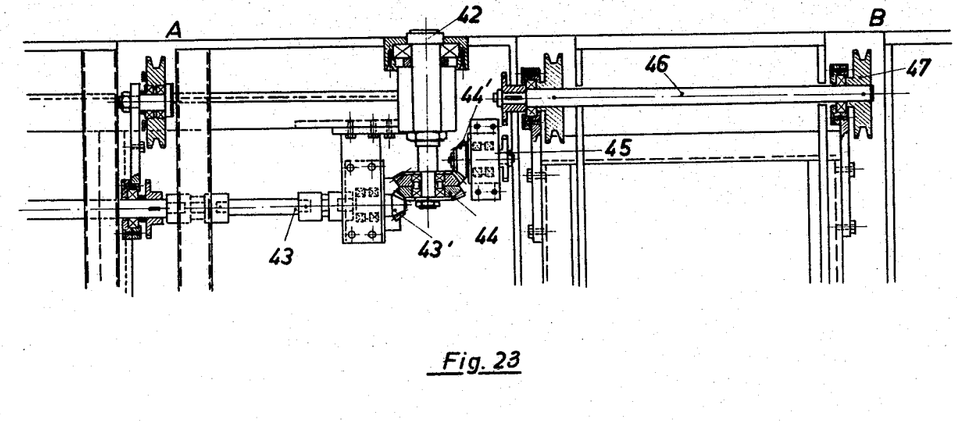
FIG. 23 shows a section of the drive unit for rotation of the table's belts from the stationary portion to the mobile portion.
Figure 24:
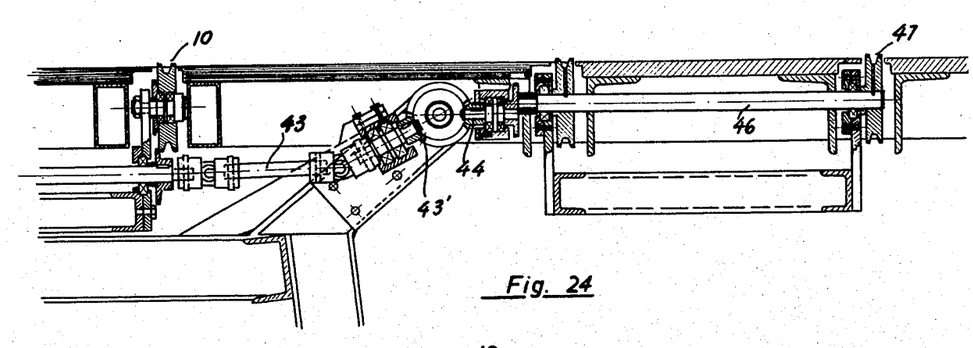
FIG. 24 shows a side view of FIG. 23.
Figure 25:
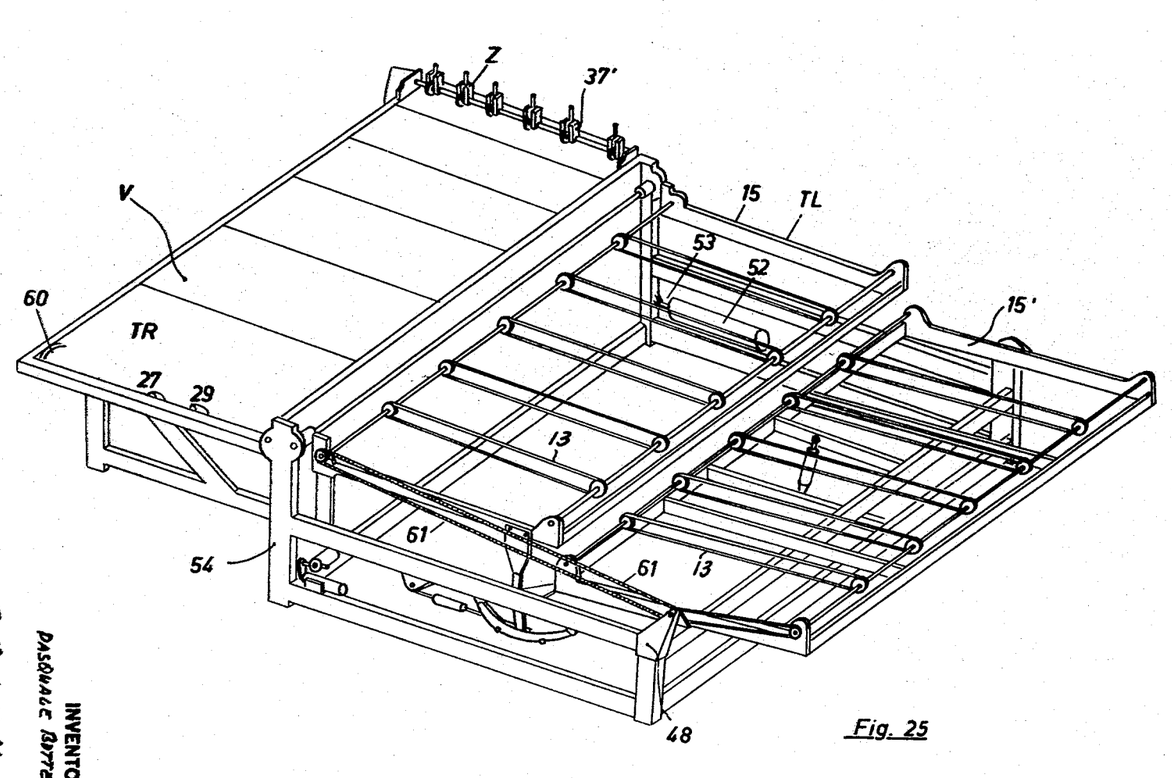
FIG. 25 shows a schematic perspective view of the whole table comprising receiving glass sheets cut from the continuous band (classical table) and table 15–15'–48–54 cutting the same (complementary table).

In fact, FIG. 12 shows a device having two purposes: to form retractable pawls for the glass sheet arranged on the classical table V and to realize a small square also retractable but swinging horizontally in order to square correctly the glass sheet on the horizontal plane of the table. The retractable pawls are formed by small blocks 27 operated by the crank and rod 26 controlled by the cam 25 which is arranged in such a manner that, when it is at the end of its travel running on the roller 25′, operates the crank and connecting rod 28 which in turn operates the swinging blocks 29, the latter moving in a compulsory way according to the parallel line in respect to the transverse axis of the table, and forces the glass sheet to move strictly in the same way accordingly to a correct squaring. Further, from practical technological experience, it appears that the breaking off is perfect only if the glass sheet is contacted at the two ends of its length and no all along the same, the present invention provides the device as shown in FIG. 15 (which is a section on a line C—C of FIG. 8) in which roller R provides two contact portions 30–31 the gap thereof is determined by the length of the strip to be broken off, the contact 30 is stationary while contact 31 is movable and the latter is operated by the lever 32 displaceable on the shaft 33. Such a changeable arrangement of contact 31 is regulated manually according to the parameter of the member to be broken off. Now, as the classical table V (FIG. 6) provides, for its rotation on the vertical plane, a tiltable portion TR (FIG. 6) it is convenient to fit a device for alignment and locking of the stationary and mobile portions at the right moment. For this purpose, at the end of its travel on the horizontal plane, the table V contacts a switch 34′ operating the cylinder 34 (FIG. 6) which rotates the cam 35 (FIG. 17) on the pivot pin 36 and blocks it in the right point for the correct alignment of the two portions according to section of the FIG. 6. Taking into consideration the particular construction of the classical table, which provides a tiltable part, TR the belt drive is performed by the device shown in FIGS. 23 and 24 in which 42 is a shaft supporting the gears 44 connecting the two portions A and B of the table; 43 is the transmission shaft driven by the main motor 1 which through the gear group 43′, 44, 44′ and drive 45 drives the shaft 46 operating pulleys 47 on which transverse belts move for transferring the glass towards the breaking off device. As above said this assembly comprises a knife carrying carriage Z and according to an improvement of the present invention, the knife carrying heads (FIGS. 20–22) are mounted on ball bearings 41 sliding on a transverse guide 37′. Each knife carrying head comprises a body 37 on one side of which is mounted the knife blocking knob 38 and on top of which a blocking lever 39 for fixing the head on the guide 37′ according to the cut length chosen.

Figure 22:
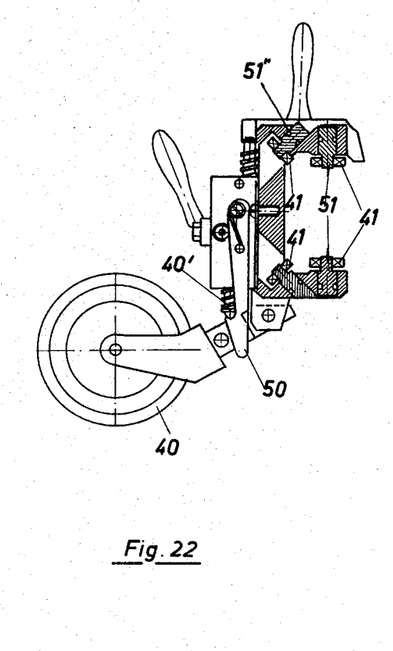

In the arrangement (FIG. 20), there is provided a lever 48 hinged at 37″ on the transverse 37, which lever 48 operates the support holder 49 holding the roller 50 forming a cutting member in such a manner that when at the end of the scoring operation a cam 60 arranged at the outer end of the table contacts and lifts the lever 48 and support 49 so that the roller 50 remains lifted during the return travel. On the other hand, at a fixed point along the length of the glass sheet a cam is arranged on the edge of the table V acting contrarywise as above described, causing the lowering of the lever 48 and lever 49 of the roller 50 so that the latter comes into contact with the glass sheet for scoring operations. In addition the structure provides the wheel 40 to guide and press the glass sheet, such a wheel, being mounted swinging and contacting the spring 40', may occasionally be lifted to the rest position and there be retained by the hook 51 (FIG. 22). The assembly is mounted on ball bearings 41 arranged on adjustable eccentric pins 51". Finally the work table (FIG. 7) is movable, i.e. may be moved away from the classical table horizontally by a hydraulic cylinder 52 arranged on the ground and fixed to the classical table at point 53 by a base member 53' in order to be able to move the frame 54 horizontally to space it, should this be required, as e.g. cutting of edges by hand, discharge of glass dust, lubrication and further requirements. Due to the complexity of this unit, the present invention provides additional secondary means to achieve the rational operation which special materials processed (glass at high temperature) may require and which are not herewith described since they are constructive features rather than invention features, but they appear clear considering the enclosed drawings. Finally suitable main and secondary electric circuits feeding the various motors are provided. The fully automatic cycle above described is operated by the above described devices and may be interrupted at any phase, and any operation, through a suitable switch fitted in the main circuit, so that the operations may be carried out separately at the desired time and manner.

Consequently the above specification does not limit the present invention but various constructive modifications and complementary means to improve the operation of the unit in question may be provided, while remaining within the scope of the following claims:

What is claimed is:

1. A glass scoring and breaking apparatus comprising, in combination, first elongated support means for supporting a sheet of glass in a substantially horizontal plane; scoring means movable in longitudinal direction over said first support means for scoring a sheet of glass supported thereon along parallel score lines respectively spaced preselected distances from each other; second support means arranged adjacent to and laterally spaced from one longitudinal edge of said first support means; breaking means arranged between said one longitudinal edge of said first support means and said second support means and comprising stationary abutment means above said plane and pressing means cooperating which said stationary abutment means for pressing a portion of the glass sheet moved in said transverse direction between pressing means and said stationary abutment means against the latter; translating means on said first support means for moving a sheet of glass thereon after being scored in a direction transverse to the longitudinal direction from said first to said second support means; drive means connected to said translating means for driving the same; control means cooperating with said drive means for automatically starting and stopping the same in such a manner that the scored glass sheet is step-wise fed in said transverse direction according to the selected distance between adjacent score lines to align at the end of each step one score line with said pressing means; and means for moving said pressing means in engagement with said glass sheet for pressing the latter against said abutment means and simultaneously moving said second support means away from said glass sheet to stress the latter at the score line aligned with said pressing means to cause breaking of said glass sheet along said score line.

2. An apparatus as defined in claim 1, wherein said drive means comprise an electric motor and said control means comprise a plurality of switches in circuit with said motor and arranged spaced from each other according to the selected distance between said score lines, and contact means moved by said motor passed said switches to operate the latter.

3. An apparatus as defined in claim 2, wherein said contact means are mounted on an endless chain driven by said motor.

4. An apparatus as defined in claim 1, where said abutment means comprises two beams extending substantially parallel to said one edge of said first support means spaced in said transverse direction from each other, and wherein said pressing means comprises roller means extending substantially parallel to said beams and arranged beneath and substantially midway between the same.

5. An apparatus as defined in claim 4, wherein said roller means comprise an elongated shaft and a pair of rollers mounted on said shaft spaced from each other in longitudinal direction of the latter and adapted to engage the bottom face of the glass sheet in the region of opposite ends of the latter, the position of at least one of said rollers being adjustable along said shaft.

6. An apparatus as defined in claim 1, wherein said first support means comprises a table having a table plate for supporting the glass sheet on the upper surface thereof, said table plate being formed with a plurality of slots therethrough, said translating means comprises a lifting frame arranged beneath said table plate, a plurality of pulleys respectively arranged in said slots and turnably supported on said lifting frame, a plurality of endless belts supported by said pulleys extending substantially parallel to each other in said transverse direction, transmission means between said drive means and said pulleys for driving the latter, and moving means connected to said lifting frame for moving the same between a rest position in which the upper runs of said belts are arranged substantially in the plane of said upper surface, and a raised position in which said upper runs are above said surface.

7. An apparatus as defined in claim 6, wherein said moving means comprises hydraulic cylinder and piston means.

8. An apparatus as defined in claim 6, wherein said second support means comprises a frame, at least one pulley system mounted on said frame, a plurality of endless belts supported on the pulleys of said one pulley system and extending substantially parallel to each other in said transverse direction, means supported on said frame and connected to said one pulley system for moving the same between an upper supporting position in which the upper runs of said belts of said pulley system are located in one plane with the upper runs of the belts of said first support means when the latter belts are in said raised position, and a lowered position downwardly tilted from said upper supporting position, and transmission means between said drive means and at least one pulley for each belt of said one pulley system.

9. An apparatus as defined in claim 8, wherein said means for moving said one pulley system between said positions thereof comprises hydraulic piston and cylinder means connected at opposite ends respectively to said frame and said one pulley system.

10. An apparatus as defined in claim 8, wherein said second support means includes further a second pulley system following said first pulley system in said transverse direction, and a plurality of belts supported on said second pulley system and extending substantially to each other in said transverse direction, said second pulley system being mounted on said frame tiltable between a feeding position in which the upper runs of the belts on said second pulley system are arranged substantially in one plane with the upper runs of said belts of said first pulley system in the upper support position of the latter, and a discharge position in which the upper runs of the belts of said second pulley system are arranged in a substantially vertical plane, transmission means between said drive means and said second pulley system, and second moving means extending between and connected to said frame and said second pulley system for tilting the latter between said positions thereof.

11. An apparatus as defined in claim 10, and including stop means at the end of said second pulley system most distant from said first pulley system and arranged to be engaged by a glass sheet portion moved by the belts on said second pulley system, said stop means being arranged and constructed to actuate said second moving means to tilt said second pulley system from said feeding to said discharge position when said stop means are engaged by a glass sheet portion and to move said second pulley system back to said feeding position when said glass sheet portion is removed from said stop means.

12. An apparatus as defined in claim 11, and including means connected to and extending between said first support means and said frame for moving the latter in said transverse direction away from said first support means.

13. An apparatus as defined in claim 1, wherein said scoring means comprise an elongated member extending in said transverse direction, a plurality of supporting heads mounted on said elongated member adjustable in longitudinal direction of the latter, and a scoring member on each of said heads.

14. An apparatus as defined in claim 13, wherein said elongated member is provided with guide ways extending in longitudinal direction of said member and each of said supporting heads is provided with roller means guided in said guide ways.

15. An apparatus as defined in claim 14, and including locking means on each of said heads for locking the same in any adjusted position along said elongated member.

16. An apparatus as defined in claim 13, wherein each of said scoring members is mounted on the respective supporting head tiltable between an active position engaging the glass sheet on said first supporting means and an inactive position removed therefrom, and including biasing means cooperating with said scoring members for normally maintaining the same in said active position.

17. An apparatus as defined in claim 16, wherein each of said scoring members is in the form of a wheel, and including a support lever tiltably mounted on the respective heads and turnably supporting said wheel, and an operating lever tiltably mounted on said elongated member and engaging the supporting levers of all scoring members, said operating lever adapted to be tilted from a rest position to an operating position to move in the latter position said scoring members to said inactive position.

18. An apparatus as defined in claim 17, and including releasable catch means cooperating with said scoring members for holding the same in said inactive position.

References Cited

UNITED STATES PATENTS

| | | | |
|---|---|---|---|
| 1,946,356 | 2/1934 | Owen | 225—96.5 |
| 1,959,545 | 5/1934 | Paxton | 225—96.5 X |
| 1,996,387 | 4/1935 | Owen | 225—96.5 |
| 2,111,393 | 3/1938 | Gaskell | 225—96.5 |
| 3,151,794 | 10/1964 | Brand | 225—96.5 |

JAMES M. MEISTER, Primary Examiner